United States Patent

[11] 3,603,142

| [72] | Inventors | Donald Saylak; Arch D. Johnston, both of Lancaster, Calif. |
|---|---|---|
| [21] | Appl. No. | 35,412 |
| [22] | Filed | May 7, 1970 |
| [45] | Patented | Sept. 7, 1971 |
| [73] | Assignee | The United States of America as represented by the Secretary of the Air Force |

[54] METHOD OF DETECTING CRACKS AND MEASURING STRAIN IN POLYMERIC STRUCTURES
5 Claims, 2 Drawing Figs.

[52] U.S. Cl. .................................................. 73/88.5 R, 73/104, 338/2
[51] Int. Cl. .................................................. G01b 7/18, G01l 1/22
[50] Field of Search ........................................ 338/2, 114; 73/104, 88.5; 200/61.8

[56] References Cited
UNITED STATES PATENTS

| 2,986,928 | 6/1961 | White | 73/88.5 R |
| 3,080,748 | 3/1963 | Burkley | 73/88.5 R |
| 3,205,464 | 9/1965 | Schwartz | 73/88.5 R X |
| 3,289,135 | 11/1966 | Anderson et al. | 73/88.5 R X |
| 3,509,942 | 5/1970 | Lindberg | 73/88.5 R X |

FOREIGN PATENTS

| 720,602 | 12/1954 | Great Britain | 338/2 |
| 939,282 | 10/1963 | Great Britain | 73/88.5 R |

Primary Examiner—Charles A. Ruehl
Attorneys—Harry A. Herbert, Jr. and Cedric H. Kuhn ABSTRACT: Strips of conductor-filled polymer are applied to the surface of polymeric structures in which it is desired to detect cracks and the conductivity of the applied strips is monitored. If a crack develops in the underlying polymeric structure and propagates itself through an applied strip, the strip will lose its ability to conduct electricity and the crack will be detected. By measuring the resistance of the strips, strain in the polymeric structure can also be determined. The invention is particularly useful in detecting cracks and strain in solid rocket propellant grains.

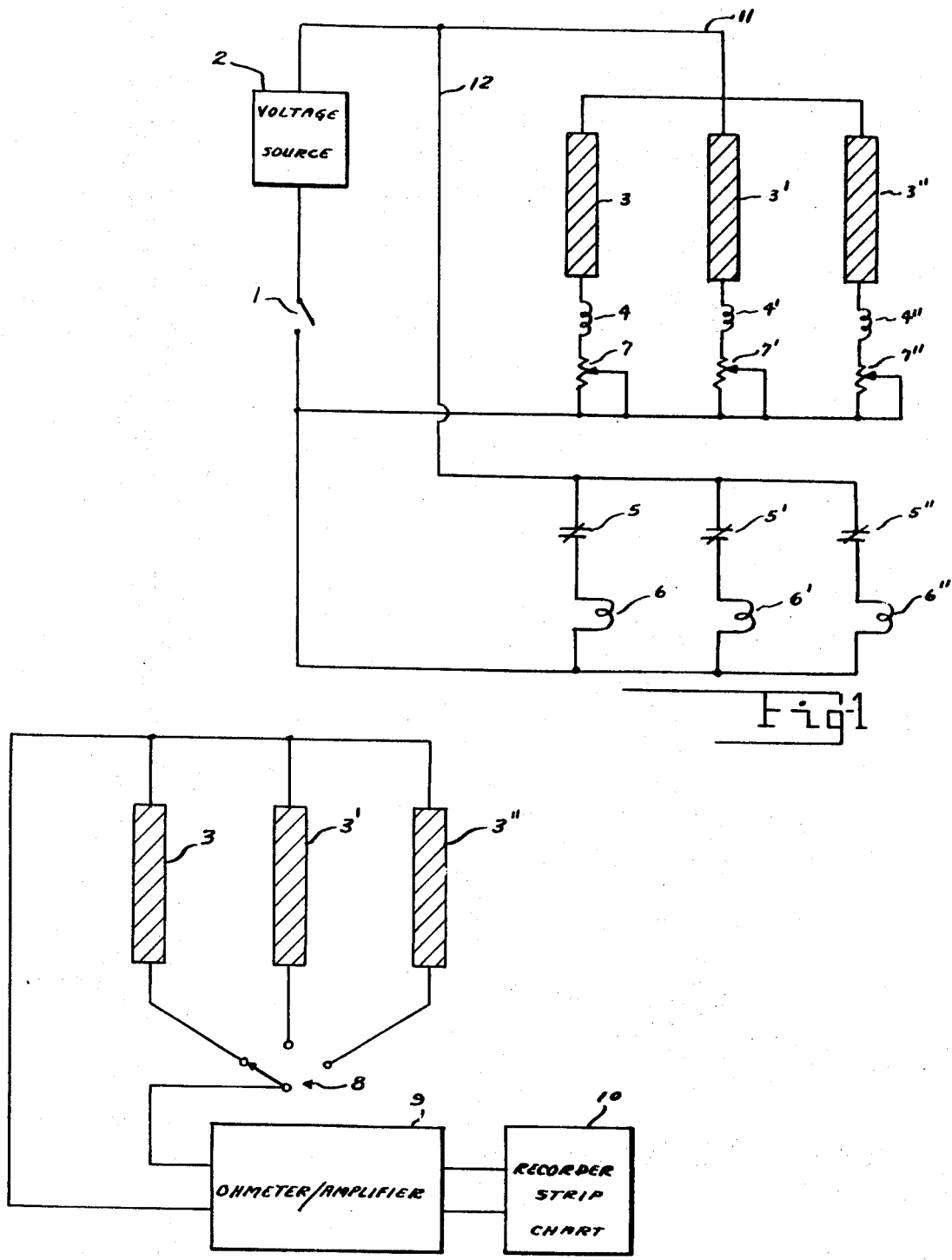

METHOD OF DETECTING CRACKS AND MEASURING STRAIN IN POLYMERIC STRUCTURES

BACKGROUND OF THE INVENTION

1. Field of the Invention

This invention relates to a method of detecting cracks and measuring strain in polymeric structures. More particularly, it relates to a method of detecting cracks and measuring strain in solid rocket propellants. In another aspect, it relates to a polymeric structure provided with means for detecting cracks and measuring strain.

2. Description of the Prior Art

It is well known that when solid rocket propellants are loaded into rocket engines and the propellant-containing engines are stored for later use, the propellant grains often develop cracks. If the cracks are discovered in time, the propellant grains may be repaired. However, if the cracks are not detected in time, it becomes necessary to replace the propellant and often the engine must be scrapped along with the propellant.

In the prior art, X-ray and ultrasonic techniques have been utilized in detecting cracks in solid rocket propellant grains. These prior art techniques have certain problems associated with them. Firstly, they are not utilized to continuously monitor rocket propellant grains for cracks but rather are carried out periodically at set intervals of time. Thus, if a crack begins to develop immediately after one X-ray or ultrasonic inspection has been made and continues to propagate until the next inspection, the grain is often beyond saving by the time the next inspection time comes. Secondly, X-ray and ultrasonic techniques are expensive. Thirdly, X-ray and ultrasonic techniques are complicated in that they require removal of the loaded rocket engine from its place of storage in order to make inspections and in that they require sophisticated apparatus to do the actual testing. Fourthly, X-ray and ultrasonic techniques can only reveal cracks that are already started and offer no way of detecting strain and predicting cracks before they actually occur.

SUMMARY OF THE INVENTION

This invention provides a method whereby polymeric structures such as solid rocket propellant grains may be inexpensively, continuously, and reliably monitored for cracks and strains. In practicing this invention, a polymeric material is filled with a conductive material such as silver, copper, or gold particles and strips of the filled polymer are coated on the surface of the propellant grain or other polymeric structure to be monitored for cracks and strain. As long as the strips remain intact they will conduct electricity. However, if a crack develops in the underlying polymeric structure and propagates itself through a strip, that strip loses its ability to conduct electricity. Thus, by continuously monitoring the ability of the strips to conduct electricity, it is possible to determine whether a crack or cracks have developed in the underlying polymeric structure. By monitoring the resistence of the strips, the invention may also be used as a strain gage to predict cracks before they actually develop. When the underlying structure is strained (deformed), the strips undergo a similar deformation. This deformation produces stress in the strips which is accompanied by increased resistance. Thus, by monitoring the resistances of the strips and detecting any increases therein, strain which is likely to produce cracks may be detected.

BRIEF DESCRIPTION OF THE DRAWING

FIG. 1 of the drawing is a schematic representation of electrical circuitry suitable for use in detecting cracks in polymeric structures; and FIG. 2 is a schematic representation of electrical circuitry suitable for use in detecting strain in polymeric structures.

DESCRIPTION OF THE PREFERRED EMBODIMENTS

In order to detect cracks and strain in polymeric structures, this invention involves the practice of three steps. They are: (1) filling a polymer with a conductive material such as silver, copper, or gold; (2) applying the filled polymer to an underlaying polymeric structure to be monitored for cracks; and (3) causing electrical current to flow through the filled polymer and monitoring or measuring the flow of current through and the resistance of the strips.

The following are detailed discussions of the three steps enumerated above.

Step 1—Filling the Polymer

In order to fill a polymer with a conductive material, a suitable polymer must first be selected ad the amount of conductive filler to be mixed with it determined. In the practice of this invention, it is preferable that the polymer to be filled have the same chemical makeup as the polymer to be monitored for cracks and strain. For example, if it is desired to monitor a polybutadiene polymer for cracks, it is preferred that the filled polymer be of polybutadiene. It is also preferred that the amount of solids in the two polymers (underlying and filled) be approximately equal. For example, if the underlying polymer is a rocket propellant grain having incorporated therein about 60 weight percent of solids such as oxidizer and fuel particles, the filled polymer should have about 60 weight percent of conductive material such as silver, copper, or gold incorporated into it. Selection of the chemical makeup of the polymer to be filled and the amount of filler to be used as described above insures that the filled polymer, when it is cured, will have physical properties, such as tensile strength and elongation, which are similar to those of the underlying polymer which is to be monitored for cracks and strain. This is desirable in order that cracks beginning in the underlying polymeric structure may be easily propagated through strips of filled polymer applied on its surface as described below.

The actual filling of the polymer may be accomplished by the same standard mixing techniques utilized in the preparation of solid rocket propellants.

Step 2—Applying the Filled Polymer

After a freshly prepared, uncured polymer has been filled with a conductive filler by standard techniques, it is applied to the surface of the polymer in which it is desired to detect cracks and strain. The strips of filled polymer are then allowed to cure. Uncured, filled polymers of the type utilized as binders in solid rocket propellants generally have a consistency similar to that of molasses and may be applied by such techniques as painting, stenciling, or even spraying. They should be oriented so as to be substantially perpendicular to the direction of maximum principal stress in order that cracks will spread across rather than lengthwise through the strips. If it is desired, strips of the filled polymer may be allowed to cure prior to their application to the underlying polymer and affixed to the underlying polymer by means of an adhesive. If an adhesive is used, it should have a modulus which is lower than that of the underlying polymer in order that a crack developing in the underlying polymer may easily spread through it and into strips above. In either case (applying uncured strips and allowing them to cure or applying cured strips with adhesive) the thickness and width of the strips should be kept at a minimum in order to permit cracks to easily propagate through them. Thicknesses of from one thirty-second to one-sixteenth inch and widths of from one-eighth to one-half inch have been found to give excellent results when strips are used on rocket propellant grains. However, if it were permissible to have cracks up to 1 foot in length but no longer in some particular case, the strips could be up to 1 foot in width. That is, the desired width of the strips is determined by the particular application.

When they are to be utilized to detect cracks in solid rocket propellant grains, the conductive strips of this invention are applied side by side, parallel to each other and the longitudinal axis of the central star core in the propellant.

Another way of applying the strips of this invention to solid rocket propellants is to paint, spray, or stencil them onto the surface of a mandrel around which a propellant grain is to be cast. When the mandrel is removed after propellant casting, the strips remain as an integral part of the grain. Since the strips are prepared from the same polymeric material as the propellant binder, they do not disturb the ballistic properties of the propellant. When a rocket propellant which is being monitored for cracks and strain by this invention is fired, these strips and the attached electrical leads are consumed by the initial blast.

Step 3—Supplying Electrical Current to the Strips and Monitoring It

One means for detecting cracks that propagate across a strip is to provide an electrical circuit in which a means for supplying current, the strip, and a lamp bulb are connected in series. Current flowing through the strip will light the lamp bulb as long as the strip remains intact. If, however, the strip is broken by the propagation of a crack through it, current flow is terminated and the lamp bulb is extinguished. A battery or any other suitable current source may be utilized to supply the current. The current through the strips should be kept at 20 microamps or below in order to eliminate the possibility of sparking and preignition of the motor. It is to be understood that the circuit may be arranged so that lamps are lighted rather than extinguished by cracks in the strips.

Strain may be detected by monitoring the resistance of the strips. Thus, means for measuring resistance may be inserted in the above circuit and utilized to predict cracks before they actually occur. For example, the resistance of polybutadiene-acrylic acid-acrylonitrile strips filled with silver and having thicknesses of about one thirty-second inch and widths of from about one-fourth to about one-half inch increases about fivefold when the strips are under strain just prior to cracking.

The current source and other elements of the electrical circuit may be attached to the filled polymer strips by means of electrical leads pushed into or otherwise suitably attached to the ends of the cured strips.

The following specific example serves to further illustrate the practice of this invention.

EXAMPLE

Several samples of cured polybutadiene-acrylic acid-acrylonitrile (PBAN) rocket propellant binder containing a total of about 60 weight percent solids such as oxidizer and fuel particles were painted with parallel, lengthwise strips of PBAN. The strips were from 0.25 to 0.50 inch wide and were filled with 60 weight percent silver particles having diameters of from about 1 to about 5 microns. The strips were allowed to cure and electrical leads were pushed into their ends. After curing, the strips had thicknesses ranging from about one-sixteenth to one thirty-second inch. The strips of each individual sample were then hooked into individual electrical circuits comprising 10-volt batteries, 10-volt, 10-milliamp lamps (one for each individual strip,) and other electrical equipment (discussed in more detail in connection with the drawing). The circuits were designed to prevent current flowing through the strips from exceeding 20 microamperes and to cause lamps to light if strips to which they were connected were cracked. After connection of the circuits, the samples were placed under strain in order to cause cracks to appear therein. As strips on the surface underwent strain, increases in resistance from about 3 ohms to about 15 ohms were detected. The increases in resistance took place gradually, reaching peaks just before cracks in the underlying PBAN propagated through the strips and cut off the flow of electricity through them. As cracks propagated through strips, lamps connected to those particular strips were lighted.

In the foregoing discussion and example, PBAN and silver have been used to specifically illustrate the invention. In the practice of the invention other polymers and other conductive materials such as copper and gold may be utilized. Silver, however, is preferred because it offers a slightly more optimum combination of efficiency and expense.

The figures of the drawing are schematic representations of electrical circuitry suitable for (1) monitoring the flow of current through and (2) detecting resistance in the strips of this invention. It is to be understood that while specific schematics are shown, there are other circuits by means of which the flow of current through and the resistance of the strips can be monitored.

Referring to FIG. 1 of the drawing (a crack detection schematic) when switch 1 is closed current will flow from voltage source 2 through line 11, strips 3, 3', and 3'' and on through coils 4, 4', and 4''. The coils 4, 4', and 4'' are parts of high-impedance relays as are normally open contacts 5, 5', and 5''. As long as current is flowing through coils 4, 4', and 4'', contacts 5, 5', and 5'' remain open. However, if current in any one of the coils is interrupted by a crack in the corresponding strip, the contact of that relay closes and the lamp 6, 6', or 6'' receives current through line 12 and is illuminated. Thus, as long as the strips 3, 3', and 3'' remain intact, none of the lamps 6, 6', 6'' will be lighted but if, for example, strip 3 cracks, lamp 6 will light. Potentiometers 7, 7', and 7'' are utilized to insure that current flowing through the strips remains low because, as stated above, high current flowing through the strips could conceivably cause sparking and preignition of a rocket engine.

In one embodiment of the invention, a list of equipment suitable for forming the circuit of FIG. 1 includes:
a. A 25-volt, 5-amp switch 1.
b. Any 10-volt current source 2.
c. 50-microammeter relays 4+5, 4'+5', and 4''+5''.
d. 10-volt, 10-milliamp lamps 6, 6', and 6''.
e. 2-megohm potentiometers 7, 7', and 7''.

FIG. 2 of the drawing is a schematic representation of a circuit which is primarily for use as a strain gage but which will also detect cracks. In the drawing, strips are again represented by numerals 3, 3', and 3''. A multiposition switch 8 is provided to connect any one of the strips with a high impedance ohmeter/amplifier 9 which in turn provides output voltage to an X-Y strip chart recorder 10. When switch 8 closes a circuit through one of the strips, an output voltage value is continuously recorded on the Y axis of the strip chart recorder. Since resistance is directly proportional to output voltage, the resistance of the strip may then be calculated. If the strip should happen to be cracked so that no current can flow through it, the recorder fails to record and the crack is thereby detected.

We claim:
1. A method for detecting cracks and measuring strain in a polymeric structure which comprises:
   a. coating at least one strip of a polymer filled with a conductive material on said polymeric structure and allowing the filled polymer to cure; and
   b. causing electrical current to flow through the strip; and
   c. measuring the flow of current through said strip and the resistance of said strip to current flow.
2. The method of claim 1 wherein said conductive material is selected from the group consisting of particles of silver, copper, and gold.
3. The method of claim 1 wherein said filled polymer has a composition which is substantially the same as that of said polymeric structure.
4. The method of claim 1 wherein said polymeric structure has solid materials incorporated therein.
5. The method of claim 4 wherein the amount of said conductive material utilized is sufficient to give said filled polymer physical properties which are similar to those of said polymeric structure.